(12) United States Patent
Wilson

(10) Patent No.: US 11,950,705 B2
(45) Date of Patent: Apr. 9, 2024

(54) COVER FOR HOOK ON HIGH CHAIR AND PORTABLE SEAT

(71) Applicant: Bernise Wilson, Long Beach, CA (US)

(72) Inventor: Bernise Wilson, Long Beach, CA (US)

( * ) Notice: Subject to any disclaimer, the term of this patent is extended or adjusted under 35 U.S.C. 154(b) by 0 days.

(21) Appl. No.: 17/936,369

(22) Filed: Sep. 28, 2022

(65) Prior Publication Data
US 2023/0051691 A1 Feb. 16, 2023

Related U.S. Application Data

(63) Continuation of application No. PCT/US2021/049743, filed on Sep. 10, 2021.

(60) Provisional application No. 63/076,938, filed on Sep. 11, 2020.

(51) Int. Cl.
| A47C 15/00 | (2006.01) |
| A47C 31/11 | (2006.01) |
| A47D 15/00 | (2006.01) |
| B62B 3/14  | (2006.01) |

(52) U.S. Cl.
CPC .............. *A47C 31/11* (2013.01); *A47D 15/00* (2013.01); *A47D 15/006* (2013.01); *B62B 3/144* (2013.01)

(58) Field of Classification Search
CPC ........ A47D 15/006; A47C 31/11; B62B 3/144
See application file for complete search history.

(56) References Cited

U.S. PATENT DOCUMENTS

| 2,826,246 A | | 3/1958 | Adams | |
| 4,805,937 A | | 2/1989 | Boucher | |
| 4,889,388 A | * | 12/1989 | Hime | A47D 15/006 |
| | | | | 297/464 |
| 5,988,744 A | * | 11/1999 | Franchak | A47D 15/006 |
| | | | | 297/219.12 |
| 6,491,996 B2 | * | 12/2002 | Digangi | B32B 27/32 |
| | | | | 297/229 |
| 6,676,210 B1 | * | 1/2004 | Peyton | A47C 31/11 |
| | | | | 297/DIG. 6 |
| 6,817,663 B1 | * | 11/2004 | Stuart | A47C 31/11 |
| | | | | 297/227 |
| 6,929,326 B2 | * | 8/2005 | Cohen-Fyffe | A47C 31/11 |
| | | | | 297/219.12 |
| 6,948,725 B2 | | 9/2005 | Sampson | |
| 7,029,066 B1 | * | 4/2006 | Myers-Jones | B62B 3/1456 |
| | | | | 297/229 |

(Continued)

OTHER PUBLICATIONS

International Search Report and Written Opinion issued in App. No. PCT/US2021/049743, dated Dec. 10, 2021, 7 pages.

*Primary Examiner* — Syed A Islam
(74) *Attorney, Agent, or Firm* — KOS IP Law LLP

(57) ABSTRACT

A cover is disclose for a hook on high chair and portable seat, the cover protects the hook-on high chair from messes that would require the chair to be cleaned and/or disassembled. The cover is fitted with elastic that hug around the top of the highchair that helps keep the cover in place. There are 2 straps to both sides of the highchair which go under the arms of the highchair and attaches to the fabric that drapes over the front of the highchair. The front of the highchair has a flap over the buckle to maintain functionality of the cover while providing quick access to the buckle. The flap is secured by hook and loop fasteners, buttons, snaps and other mechanisms. The front of the cover has two openings that allow legs through the cover and highchair.

17 Claims, 2 Drawing Sheets

(56) References Cited

U.S. PATENT DOCUMENTS

| | | | | |
|---|---|---|---|---|
| 8,042,869 B2 | 10/2011 | McClintock | | |
| 8,770,663 B2 * | 7/2014 | Zack | ................... | B60N 2/60 |
| | | | | 297/181 |
| 9,370,254 B2 * | 6/2016 | Weber | ................... | B60N 2/2812 |
| 9,622,591 B2 * | 4/2017 | Lipson | ................... | A47D 1/00 |
| 9,648,963 B2 * | 5/2017 | Johnston | ................... | A47C 31/113 |
| 10,905,255 B1 * | 2/2021 | Miale | ................... | B60N 2/914 |
| 2005/0082886 A1 * | 4/2005 | Sganga | ................... | A47C 31/11 |
| | | | | 297/219.1 |
| 2006/0232112 A1 * | 10/2006 | Karr | ................... | A47C 31/11 |
| | | | | 297/219.12 |
| 2008/0084099 A1 * | 4/2008 | Palgon | ................... | A47D 15/006 |
| | | | | 297/219.12 |
| 2010/0065172 A1 * | 3/2010 | Dus | ................... | A47D 15/006 |
| | | | | 150/158 |
| 2011/0049951 A1 | 3/2011 | Bettencourt | | |
| 2013/0015691 A1 * | 1/2013 | Feng | ................... | B60N 2/286 |
| | | | | 297/250.1 |
| 2016/0360896 A1 * | 12/2016 | Russitano | ................... | A47C 31/11 |

* cited by examiner

COVER FOR HOOK ON HIGH CHAIR AND PORTABLE SEAT

CROSS REFERENCE TO RELATED APPLICATIONS

This application is a continuation patent application of International Application No. PCT/US2021/049743, filed on 2021 Sep. 10, which claims priority to provisional patent application Ser. No. 63/076,938, filed on 2021 Sep. 11, the entire contents of which are expressly incorporated herein by reference.

STATEMENT RE: FEDERALLY SPONSORED RESEARCH/DEVELOPMENT

Not Applicable.

BACKGROUND

The various aspects and embodiments described herein relate to a cover for a hook on high chair and portable seat.

The idea for this cover came to be around January 2020 when my child started using a high chair. After having to clean the hook-on high chair once, I searched online and in stores for a removable high chair cover. After searching for a high chair cover or comparable product that would serve that purpose, I could not find any product that would serve this particular function.

During mealtimes, messes are to be expected with infants and toddlers. Some highchairs or seats come with a fabric material that are washable, however, more often the care instructions can be time consuming and involve hand washing, air drying, or just be difficult to remove from the highchair.

BRIEF SUMMARY

This cover is designed to make cleaning the highchair or seat easier by simply placing the cover before mealtimes and removing the cover after a particularly messy meal. It also prevents the infant or toddler from siting in soiled seat from the previous meal.

The cover saves time cleaning the highchair, and time that entails i.e, disassembling it, following care instructions. It also keeps the chair hygienic for the infant and toddler so that they are not sitting in a soiled seat.

Though there are highchair covers that are designed for traditional standing highchairs, there is currently no highchair cover on the market that fits hook on highchairs, or a chair or seat of similar size.

Therefore, there is a need for a removable cover for a highchair or seat that: 1. Can help keep the seat clean 2. Reduce cleaning time involved with maintaining the seat, such as disassembling the chair, washing the fabric seat 3. Reduce wear and tear on the highchair thus prolonging its usability 4. Is easy to use with simple care instructions 5. And is safe and simple to use on the highchair or seat.

The uniqueness of this product is that it is a removeable cover designed specifically, but not limited to, hook-on high chairs or portable seats. There were no comparable products in my search before and during the time I created my prototypes.

This invention relates to highchair but can also be used for any seat of similar structure, and it designed to keep the highchair or seat from of mess from meals. The removability of the cover allows the caregivers to remove the cover and replace with a new a cover so that the child will not be sitting in a soiled seat during the next meal. The washability or disposability of the cover allows for easy cleaning of the cover.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1A:
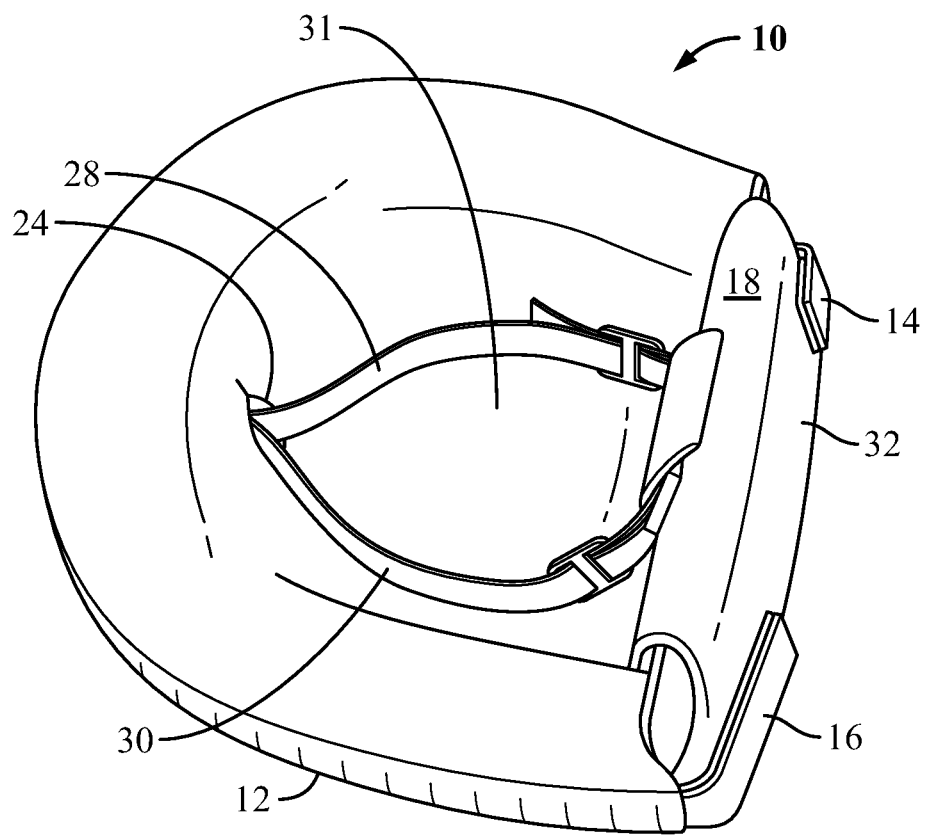
FIG. 1 is an upper side view of the cover.
Figure 1B:
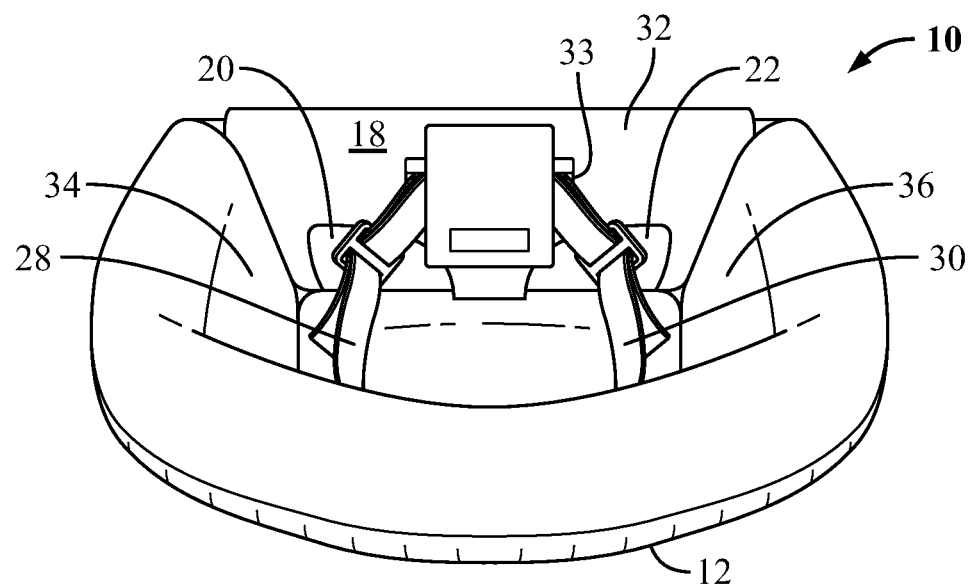
Figure 2:
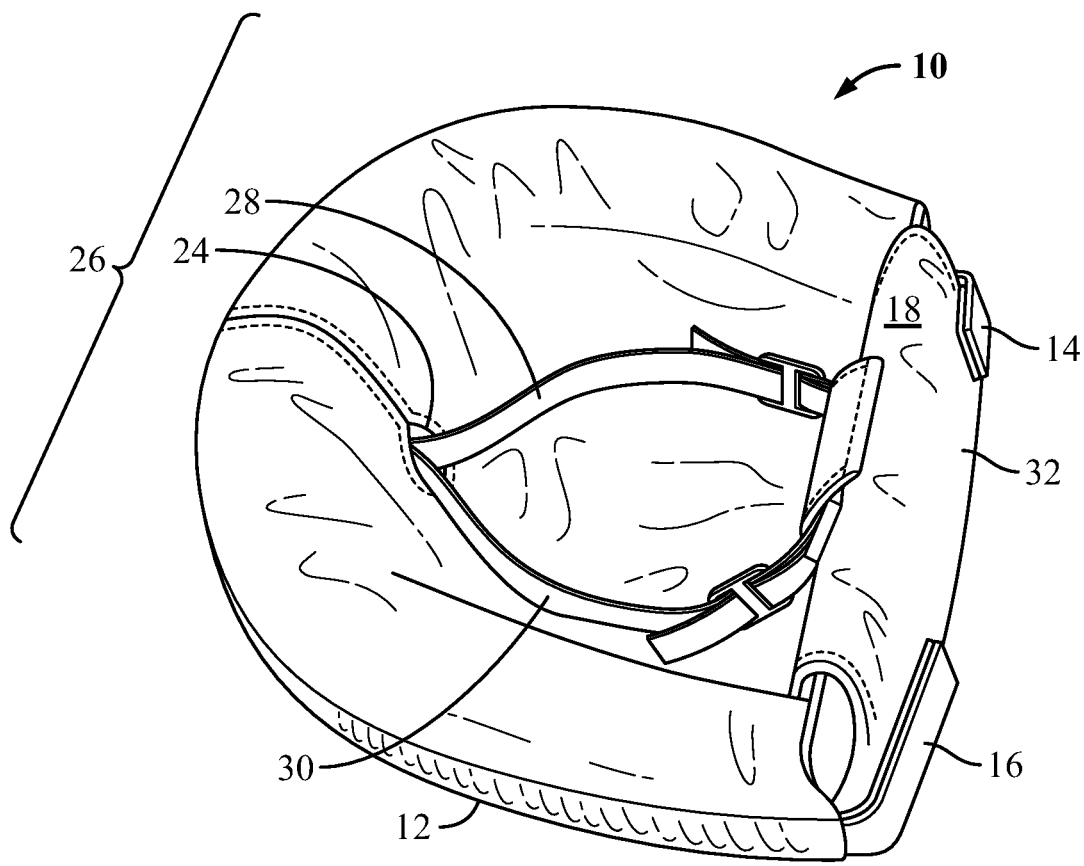
FIG. 2 is an upper side view of the cover.
Figure 3:
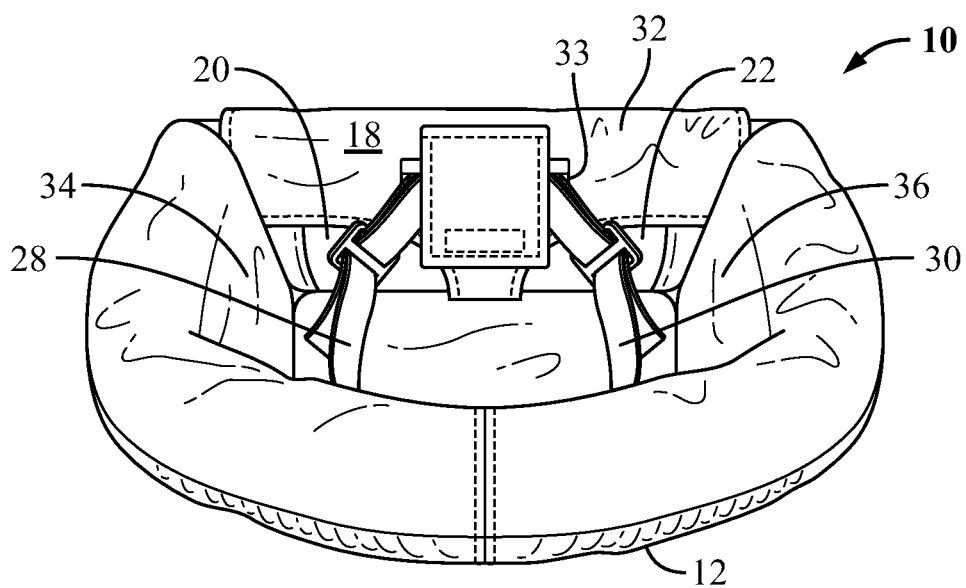
FIG. 3 is an upper rear view of the cover.

The purpose of the Cover 10 for Hook on High Chair and Portable Seat is to keep the hook-on high chair clean during without hindering the functionality of the high chair. This cover 10 helps protect the hook-on high chair from messes that would require the chair to be cleaned and/or disassembled.

The cover is fitted with elastic 12 that hug around the top of the highchair that helps keep the cover in place. There are 2 straps 14, 16 to both sides of the highchair. These straps 14, 16 go under the arms of the highchair and attaches to the fabric 18 that drapes over the front of the highchair. Securement of the straps 14, 16 include the following, hut are not limited to hook and loop fasteners, buttons, snaps.

The front of the highchair has a flap over the buckle to maintain functionality of the cover while providing quick access to the buckle. The flap is secured by hook and loop fasteners, buttons, snaps and other mechanisms. The front of the cover has two openings 20, 22 that allow legs through the cover 10 and highchair. Another version of the does not have a flap to the front of the cover.

An opening 24 at the back 26 allows the harness straps 28, 30 to threaded through the cover.

Certain embodiments of the cover 10 include, hut are not limited to cotton, polyester, linen, bamboo, a blend of fabrics that are machine washable and dryer safe.

A removable cover 10 for a highchair or seat is disclosed. The removable cover 10 may include various parts including but not limited to a front panel 32 which may have an opening 33 to access a buckle, side panels 34, 36, a backing that has an opening to access harness straps, and a seat 31. The highchair cover is secured to the highchair by use of straps 14, 16 that join the side panels to the front panel by use of but not limited to hook and loop fasteners, buttons, snaps on, or ties. There may be elastic 12 along both sides and the back to ensure a good fit. The cover is removable from the highchair to allow for easy cleaning and to help reduce dirt and mess to the highchair The highchair cover 10 discussed herein may be sewn or heat sealed, depending on material used, to form a continuous portion.

The highchair cover discussed herein may have an opening 33 covered by a flap, allowing for easy access to a buckle while keeping the highchair or seat free of mess during use.

The highchair cover 10 discussed herein may have an opening 24 which accommodates a seat belt of the highchair or seat.

The highchair cover 10 discussed herein may be designed to allow a child's legs though.

The material of the highchair cover discussed herein is not limited to knit fabric, woven fabric, nonwoven fabrics, fabric blends, other washable and non-washable fabrics, or disposable materials.

The highchair cover 10 discussed herein may have panels 32, 34, 36 that consist of more than one layer.

The highchair cover 10 discussed herein may have padding or cushion in between the seat layers of the seat 31 that are not limited to polyester batting or other washable materials.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

The invention claimed is:

1. A removable cover for a highchair or seat to allow for easy cleaning and to help reduce dirt and mess to the highchair, the removable cover comprising:
   a front panel with an opening to access a buckle,
   side panels with securement straps that fit under left and right bars of the highchair or seat, the securement straps being securable to the front panel,
   a back panel that has an opening to access harness straps, and
   a seat.

2. The removable highchair cover of claim 1 wherein the securement straps are securable to the front panel with a securing mechanism, the securing mechanism being any one selected from a group consisting of hook and loop fasteners, buttons, snaps on, ties and combinations thereof.

3. The removable highchair cover of claim 1 further comprising an elastic member along both side panels and a back to ensure a good fit with the highchair or seat.

4. The removable highchair cover of claim 1 wherein the panels are sewn or heat sealed to form a continuous portion.

5. The removable highchair cover of claim 1 wherein the front panel has an opening and a flap which covers the opening, and the opening allows for easy access to a buckle while keeping the highchair or seat free of mess during use.

6. The removable highchair cover of claim 1 wherein the opening of the back panel accommodates a seat belt of the highchair or seat.

7. The removable highchair cover of claim 1 wherein the cover is designed to allow a child's legs to fit through openings formed by the front and side panels.

8. The removable highchair cover of claim 1 wherein the front panel, side panels and back panel are fabricated from a knit fabric, woven fabric, nonwoven fabrics, fabric blends, washable fabrics, non-washable fabrics, disposable materials or any combination thereof.

9. The removable highchair cover of claim 1 wherein one or more of the front panel, side panels and back panel has more than one layer.

10. The removable highchair cover of claim 1 wherein the seat has a padding between seat layers, and the padding is polyester batting, a washable material or any combination thereof.

11. A method of attaching a removable highchair cover to a high chair, the method comprising the steps of:
    placing the removable highchair cover onto the high chair;
    stretching out an elastic formed in a back panel of the highchair cover;
    lifting the lower edge of the back panel above and over a back and sides of the highchair;
    attaching left and right straps attached to side panels to a front panel of the removable highchair cover; and
    slipping a buckle of the highchair cover and straps of the highchair or seat through one or more openings of the highchair cover.

12. The method of claim 11 wherein the detaching step includes a step of removing hooks from loops or removing a button from a button hole.

13. The method of claim 11 further comprising a step of lifting a flap disposed on the front panel to expose a buckle of the highchair or seat.

14. The method of claim 11 further comprising a step of lifting the highchair cover off of the highchair.

15. The method of claim 11 wherein the lifting step further comprises a step of lifting a lower edge of the side panels.

16. The method of claim 11 wherein the highchair cover is attached to the highchair only with the strap.

17. The method of claim 11 further comprising a step of detaching left and right straps which is attached to side panels from a front panel of the highchair cover.

* * * * *